US011768886B2

(12) United States Patent
Lim et al.

(10) Patent No.: US 11,768,886 B2
(45) Date of Patent: *Sep. 26, 2023

(54) COMPUTERIZED SYSTEMS AND METHODS FOR MANAGING AND MONITORING SERVICES AND MODULES ON AN ONLINE PLATFORM

(71) Applicant: Coupang Corp., Seoul (KR)

(72) Inventors: Seul Ki Lim, Kyunggido (KR); Jae Man Jang, Seoul (KR)

(73) Assignee: COUPANG CORP., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/236,146

(22) Filed: Apr. 21, 2021

(65) Prior Publication Data

US 2022/0043866 A1 Feb. 10, 2022

Related U.S. Application Data

(63) Continuation of application No. 16/986,589, filed on Aug. 6, 2020, now Pat. No. 11,030,261.

(51) Int. Cl.
*G06F 16/951* (2019.01)
*G06F 9/54* (2006.01)
(Continued)

(52) U.S. Cl.
CPC .......... *G06F 16/951* (2019.01); *G06F 9/547* (2013.01); *G06F 16/955* (2019.01); *G06F 16/9538* (2019.01)

(58) Field of Classification Search
CPC .............. G06F 21/6218; G06F 21/62; G06F 2221/2149; G06F 3/04842; G06F 3/0304;
(Continued)

(56) References Cited

U.S. PATENT DOCUMENTS 7,774,331 B2 * 8/2010 Barth .................. G06F 16/9535
707/706
8,707,451 B2 * 4/2014 Ture ..................... G06F 16/951
726/28
(Continued)

FOREIGN PATENT DOCUMENTS

CN 101971205 A 2/2011
CN 107220374 A 9/2017
(Continued)

OTHER PUBLICATIONS

Notice of Preliminary Rejection dated Jul. 21, 2021, by the Korean Patent Office in counterpart Korean Application No. 10-2020-0178997, 14 pages.
(Continued)

*Primary Examiner* — Angelica Ruiz
(74) *Attorney, Agent, or Firm* — FINNEGAN, HENDERSON, FARABOW, GARRETT & DUNNER LLP

(57) ABSTRACT

The present disclosure may be directed to systems and methods for managing and monitoring services and modules. The system may include receiving, from a user device, a request to perform a test on a target application programming interface; calling the target application programming interface; and retrieving a search result page associated with the target application programming interface. The system may include retrieving a rule based on the target application programming interface and applying the rule to the retrieved search result page associated with the target application programming interface. The system may include determining whether to implement the target application programming interface based on the results of the applied rule.

16 Claims, 8 Drawing Sheets

(51) Int. Cl.
*G06F 16/9538* (2019.01)
*G06F 16/955* (2019.01)

(58) Field of Classification Search
CPC .. G06F 8/71; G06F 2221/2111; G06F 16/951; G06F 11/3672; G06F 11/3684; G06F 11/3688; G06F 8/427; G06F 9/547
See application file for complete search history.

(56) References Cited

U.S. PATENT DOCUMENTS

| | | |
|---|---|---|
| 2007/0038894 A1 | 2/2007 | Stasa et al. |
| 2007/0209080 A1 | 9/2007 | Ture et al. |
| 2008/0155515 A1 | 6/2008 | Stewart |
| 2008/0235196 A1 | 9/2008 | Broussard et al. |
| 2013/0151417 A1 | 6/2013 | Gupta |
| 2014/0052617 A1 | 2/2014 | Chawla et al. |
| 2015/0088689 A1 | 3/2015 | de Castro Leao Monteiro et al. |

FOREIGN PATENT DOCUMENTS

| | | |
|---|---|---|
| CN | 108549569 A | 9/2018 |
| CN | 110457086 A | 11/2019 |
| JP | 2006-268118 | 10/2006 |
| JP | 2006-338540 | 12/2006 |
| KR | 10-2004-0009534 | 1/2004 |
| KR | 10-2009-0003853 | 1/2009 |
| KR | 10-2018-0080227 | 7/2018 |

OTHER PUBLICATIONS

International Search Report and Written Opinion dated May 18, 2021, in PCT International Application No. PCT/IB2021/051250, 10 pages.

Search Report in Taiwan Patent Application No. 110100365 dated Dec. 8, 2021 (1 page).

Notice of Allowance dated Oct. 18, 2021, by the Korean Intellectual Property Office in counterpart Korean Application No. 10-2020-0178997, 4 pages.

Hong Kong Examination Notice in counterpart Hong Kong Application No. 22021030789.2 dated May 19, 2022 (5 pages).

* cited by examiner

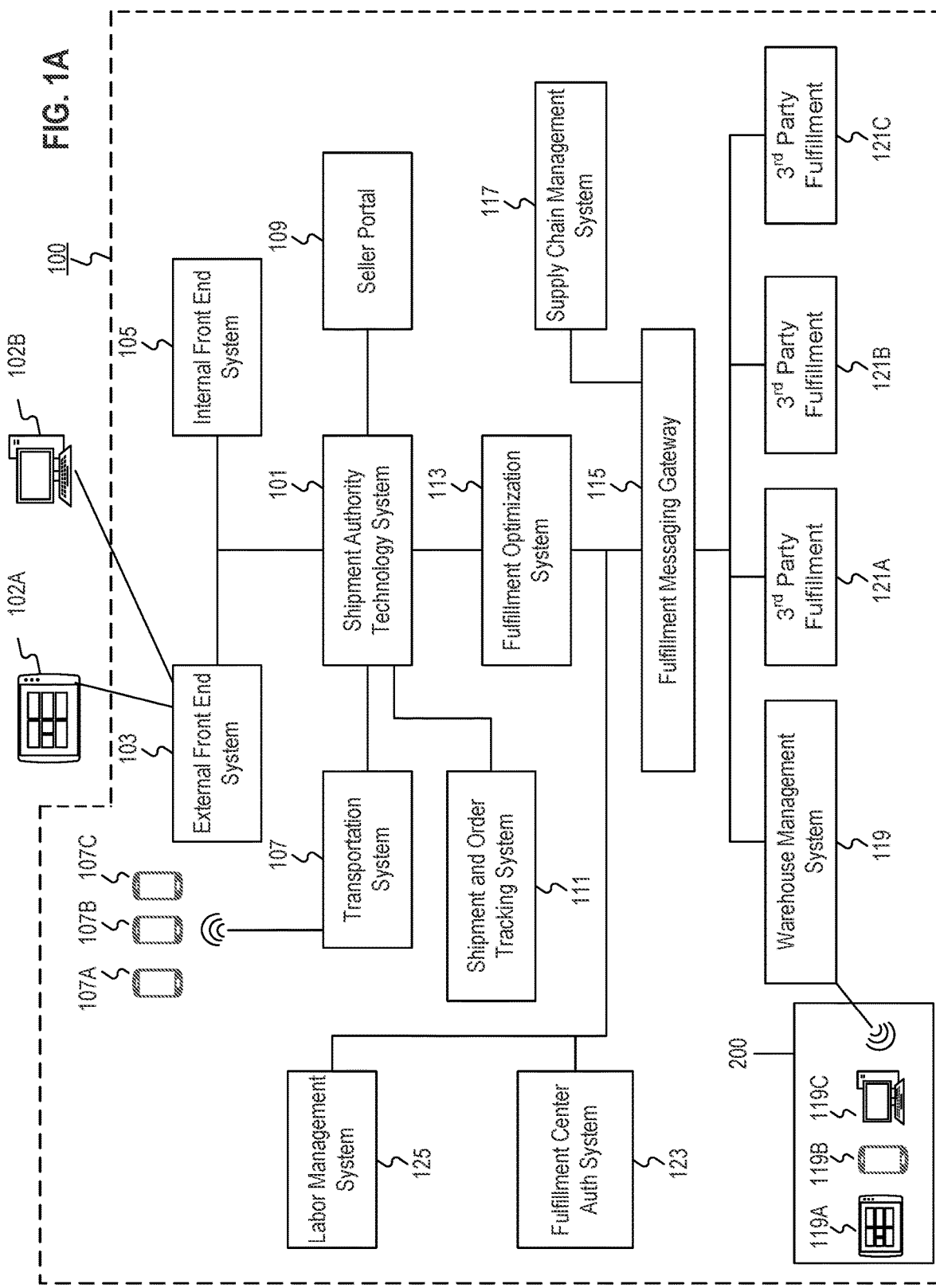

COMPUTERIZED SYSTEMS AND METHODS FOR MANAGING AND MONITORING SERVICES AND MODULES ON AN ONLINE PLATFORM

RELATED APPLICATIONS

This application is a continuation of U.S. patent application Ser. No. 16/986,589 (now allowed) filed on Aug. 6, 2020, which is hereby incorporated by reference in the present application in its entirety.

TECHNICAL FIELD

The present disclosure generally relates to computerized systems and methods for managing and monitoring services and modules. In particular, embodiments of the present disclosure relate to inventive and unconventional systems related to implementing services and modules by calling target application programming interfaces and applying rules to the services and modules.

BACKGROUND

Service and module implementation by developers often relies on testing services and modules in order to successfully deploy and manage new and existing services and modules. When services and modules are not tested, the intended behavior of the service or module may not be preserved. Service and module tests include controls that are critical to preserving the intended behavior of the service or module, especially when the service or module is modified or when new services and modules are implemented.

Properly testing services and modules is critically important to maintaining the quality of any online platform. However, managing and monitoring services and modules may be difficult when online platforms have a large number of services and modules, which are difficult to track. This difficulty in managing and monitoring a large number of services and modules is problematic when the intended behavior of the services or modules are not preserved. Furthermore, manually testing each service or module is often difficult and time-consuming for an organization.

The quality of an organization's online platform and, consequently, the experiences of users are severely reduced when the online platform includes faulty services and modules that have not been tested properly. The quality of an organization's online platform would be significantly improved if the online platform automatically and efficiently managed and monitored services and modules implemented tested services and modules accordingly.

Therefore, there is a need for improved systems and methods for managing and monitoring services and modules.

SUMMARY

One aspect of the present disclosure is directed to a system for managing and monitoring services and modules. The system may include a memory storing instructions and at least one processor configured to execute the instructions to receive, from a user device, a request to perform a test on a target application programming interface; call the target application programming interface; and retrieve a search result page associated with the target application programming interface. The instructions may include retrieving a rule based on the target application programming interface; applying the rule to the retrieved search result page associated with the target application programming interface; and based on the results of the applied rule, determining whether to implement the target application programming interface.

Another aspect of the present disclosure is directed to a method for managing and monitoring services and modules. The method may include receiving, from a user device, a request to perform a test on a target application programming interface; calling the target application programming interface; and retrieving a search result page associated with the target application programming interface. The method may include retrieving a rule based on the target application programming interface; applying the rule to the retrieved search result page associated with the target application programming interface; and based on the results of the applied rule, determining whether to implement the target application programming interface.

Yet another aspect of the present disclosure is directed to a system for managing and monitoring services and modules. The system may include a memory storing instructions and at least one processor configured to execute the instructions to receive, from a user device, a request to perform a test on a target application programming interface; call the target application programming interface; and retrieve a search result page associated with the target application programming interface. The instructions may include retrieving a rule based on the target application programming interface; loading a uniform resource link associated with the target application programming interface; and extracting data from the retrieved search result page, wherein the rule is applied to the extracted data, and the user device specifies the extracted data in accordance with the rule. The instructions may include applying the rule to the extracted data from the retrieved search result page associated with the target application programming interface; and based on the results of the applied rule, determining whether to implement the target application programming interface.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for managing and monitoring services and modules. The disclosed embodiments may include a monitoring platform that sends a request to perform a test on a target service or module to a page response system. The page response system may call a target application programming interface or a target webpage uniform resource link (URL) based on the request. Based on the call by the page response system, a webpage with an implemented module or a webpage may be retrieved and sent to the page response system. The page response system may parse the retrieved webpage by loading the URL for the retrieved webpage associated and extracting data from the retrieved webpage.

The page response system may send the retrieved webpage to a rule application system, which may retrieve at least one rule from based on the characteristics of the webpage. The rule application system may apply the retrieved rule to the data extracted from the webpage. The retrieved rule may include a predetermined condition for determining whether the webpage is normal or abnormal. The rule application system may send the results of the applied rule to the monitoring platform. Based on the characteristics of the webpage and the results of applied rule, the monitoring platform may instruct the rule application system to send an alert or analytics of the results of the applied rule to at least one user device.

In some embodiments, if the results indicate that the webpage is abnormal, then the monitoring platform may not implement application programming interface or the webpage. If the results indicate that the webpage is normal, then the monitoring platform may implement the application programming interface or the webpage. The monitoring platform may send a response to a device or a user where the response may include an indication of whether the application programming interface or the webpage has been implemented, analytical data associated with the applied rule, an indication of whether alerts or analytics were sent to user devices, etc.

Referring to FIG. 1A, a schematic block diagram 100 illustrating an exemplary embodiment of a system comprising computerized systems for communications enabling shipping, transportation, and logistics operations is shown.

As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
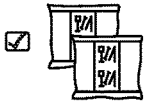
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
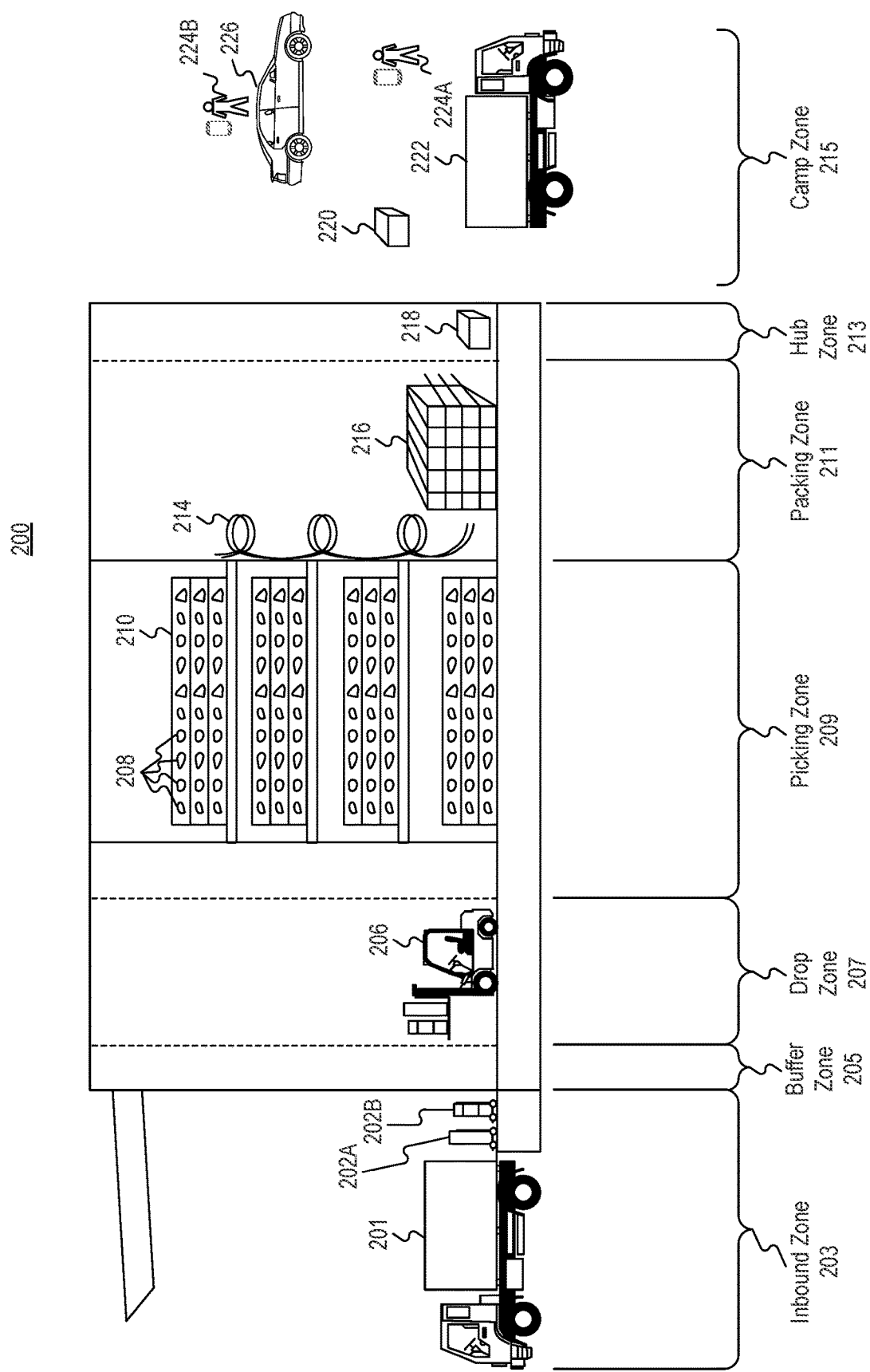
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 2028. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
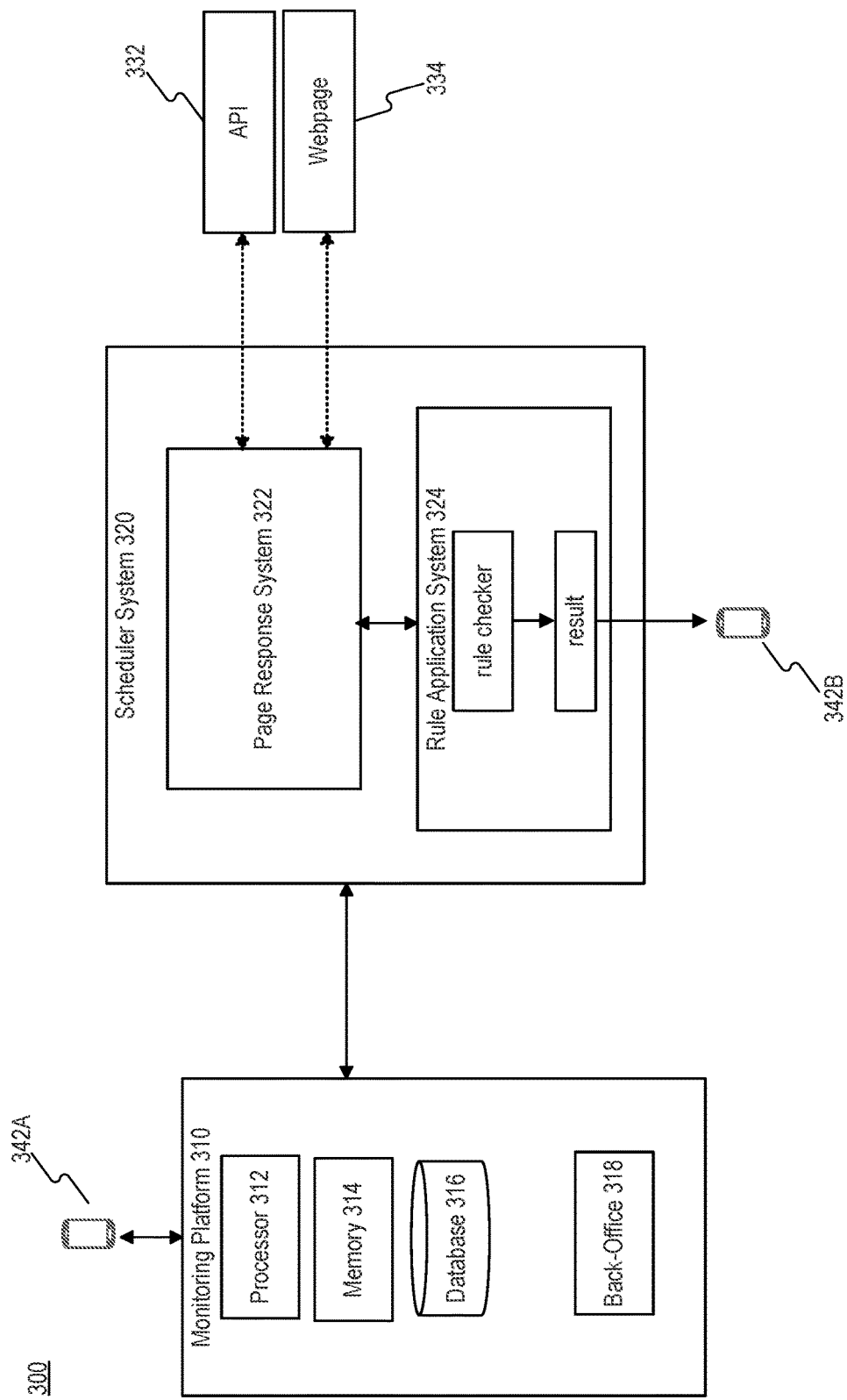
FIG. 3 is a schematic block diagram illustrating an exemplary embodiment of a network comprising computerized systems for managing and monitoring services and modules, consistent with disclosed embodiments.

Referring to FIG. 3, a schematic block diagram illustrating an exemplary embodiment of a network comprising computerized systems for managing and monitoring services and modules, consistent with disclosed embodiments is shown. As illustrated in FIG. 3, a system 300 may include a monitoring platform 310, a scheduler system 320, an application programming interface (API) 332, a webpage 334, and user devices 342A and 342B, each of which may communicate with each other via a network. In some embodiments, API 332 may include a plurality of APIs and webpage 334 may include a plurality of webpages. In some embodiments, API 332 may be a mobile application programming interface (MAPI) configured to provide information to and/or receive requests from mobile devices (e.g., a smartphone). Monitoring platform 310 may include a processor 312, a memory 314, a database 316, and a back-office software 318. Scheduler system 320 may include a page response system 322 and a rule application system 324. In some embodiments, the systems and components of system 300 may communicate with the other components of system 300 via a direct connection, for example, using a cable. In some other embodiments, system 300 may be a part of system 100 of FIG. 1A and may communicate with the other components of system 100 via a network or via a direct connection, for example, using a cable. The systems and components of system 300 may each comprise a single computer or may each be configured as a distributed computer system including multiple computers that interoperate to perform one or more of the processes and functionalities associated with the disclosed examples.

System 300 may comprise processors (e.g., processor 312), memories (e.g., memory 314), and databases (e.g., database 316). The processors may be one or more known processing devices, such as a microprocessor from the Pentium™ family manufactured by Intel™ or the Turion™ family manufactured by AMD™. The processors may constitute a single core or multiple core processor that executes parallel processes simultaneously. For example, the processors may use logical processors to simultaneously execute and control multiple processes. The processors may implement virtual machine technologies or other known technologies to provide the ability to execute, control, run, manipulate, store, etc. multiple software processes, applications, programs, etc. In another example, the processors may include a multiple-core processor arrangement configured to provide parallel processing functionalities to allow system 300 to execute multiple processes simultaneously. One of ordinary skill in the art would understand that other types of processor arrangements could be implemented that provide for the capabilities disclosed herein.

The memories may store one or more operating systems that perform known operating system functions when executed by the processors, respectively. By way of example, the operating system may include Microsoft Windows, Unix, Linux, Android, Mac OS, iOS, or other types of operating systems. Accordingly, examples of the disclosed invention may operate and function with computer systems running any type of operating system. The memories may be a volatile or non-volatile, magnetic, semiconductor, tape, optical, removable, non-removable, or other type of storage device or tangible computer readable medium.

The databases may include, for example, Oracle™ databases, Sybase™ databases, or other relational databases or non-relational databases, such as Hadoo P™ sequence files, HBase™, or Cassandra™. The databases may include computing components (e.g., database management system, database server, etc.) configured to receive and process requests for data stored in memory devices of the database(s) and to provide data from the database(s). The databases may include NoSQL databases such as HBase, MongoDB™ or Cassandra™. Alternatively, the databases may include relational databases such as Oracle, MySQL and Microsoft SQL Server. In some embodiments, the databases may take the form of servers, general purpose computers, mainframe computers, or any combination of these components.

The databases may store data that may be used by the processors for performing methods and processes associated with disclosed examples. The databases may be located in the systems or components of system 300 or, alternatively, they may be in external storage devices located outside of the systems or components of system 300. Data stored in the databases may include any suitable data associated with services or modules (e.g., rule checker results from rule application system 324, module data, webpage data, user data, request data, parsed data from page response system 322, rules to be used by rule application system 324, etc.).

User devices 342A or 342B may be a tablet, mobile device, computer, or the like. User devices 342A or 342B may include a display. The display may include, for example, liquid crystal displays (LCD), light emitting diode screens (LED), organic light emitting diode screens (OLED), a touch screen, and other known display devices. The display may show various information to a user. For example, it may display a webpage (e.g., FIGS. 1B-1E) that includes an implemented module or an option to test a service or module. User devices 342A or 342B may include one or more input/output (I/O) devices. The I/O devices may include one or more devices that allow user devices 342A or 342B to send and receive information from user devices 342A or 342B or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from monitoring platform 310 by, for example, establishing wired or wireless connectivity between the user devices 342A or 342B and monitoring platform 310.

In some embodiments, the users associated with user devices 342A or 342B may be external users (e.g., customers that interact with API 332 or webpage 334) or internal users (e.g., employees of an organization that develops, owns, operates, or leases systems 100 or 300). Internal front end system 105 may be implemented as a computer system that enables the users associated with user devices 342A or 342B to interact with system 300. For example, in some embodiments, internal front end system 105 may be implemented as a web server that enables internal users associated with user devices 342A or 342B to modify services or modules, add new services or modules, submit requests to test (e.g., perform verifications on) services or modules, submit requests to implement services or modules (e.g., services or modules may be implemented by inserting the service or module into a webpage), to view diagnostic and statistical information about tested or implemented services or modules, etc. In some embodiments, internal front end system 105 may run custom web server software designed to receive and process requests from systems or devices depicted in systems 100 or 300, acquire information from databases (e.g., database 316) and other data stores based on those requests, and provide responses to the received requests based on acquired information.

In some embodiments, monitoring platform 310 may receive a request from a user (e.g., internal users) or user device 342A to perform a test on a target service or module. Monitoring platform 310 may send the request to scheduler system 320. In some embodiments, scheduler system 320 may, based on a scheduled time or triggered by an event, automatically test services or modules. In some embodiments, scheduler system 320 may concurrently test a plurality of services or modules. Scheduler system 320 may log data associated with tests, including estimated run times of the tests, test results, or actual run times of the tests.

Based on the received request, page response system 322 may call a target API 332 or a target webpage uniform resource link (URL). Based on the call by page response system 322, target API 332 may retrieve a webpage with an implemented module (e.g., webpage may be SRP of FIG. 1B) or target webpage 334 may retrieve a webpage (e.g., a webpage may be SRP of FIG. 1B without an implemented module). API 332 or webpage 334 may send the retrieved webpage to page response system 322.

Page response system 322 may parse the retrieved webpage by loading the URL (e.g., which references JSON or HTML code) for the retrieved webpage associated with API 332 or the retrieved webpage associated with webpage 334 and extracting data from the retrieved webpage. In some embodiments, user device 342A (e.g., associated with internal users) may specify the data to be extracted from the webpage. In some embodiments, page response system 322 may automatically determine the data to be extracted from the webpage based on characteristics of the webpage (e.g., the extracted data may include a type of search query on the webpage, product or item categories on the webpage, type of products or items on the webpage for a specific category, type of products or items on the webpage as a result of a search query, etc.). In some embodiments, page response system 322 may send the retrieved webpage to rule application system 324 and rule application system 324 may retrieve at least one rule from database 316 based on the characteristics of the webpage. Page response system 322 may determine the data to be extracted from the webpage based on the retrieved rule. Page response system 322 may send the retrieved webpage or the extracted data from the webpage to rule application system 324.

Rule application system 324 may apply the retrieved rule to the data extracted from the webpage. The retrieved rule may include a predetermined condition for determining whether the webpage is normal or abnormal. For example, a rule may test the number of products that appear on a webpage after a search query is submitted. The predetermined condition of the rule may be a number of products that appear on the webpage after the search query is submitted. If the results of the applied rule indicate that the number of products that appear on the webpage is different from the predetermined condition, then rule application system 324 may determine that the webpage is abnormal. If the results of the applied rule indicate that the number of products that appear on the webpage is the same as the predetermined condition, then rule application system 324 may determine that the webpage is normal.

In another example, a rule may test the number of products that appear on a webpage after a product category is selected. The predetermined condition of the rule may be a number of products that appear on the webpage after the product category is selected. If the results of the applied rule indicate that the number of products that appear on the webpage is different from the predetermined condition, then rule application system 324 may determine that the webpage is abnormal. If the results of the applied rule indicate that the number of products that appear on the webpage is the same as the predetermined condition, then rule application system 324 may determine that the webpage is normal.

In another example, a rule may test the types of products that appear on a webpage after a search query is submitted. For example, a search query may include "dairy products." The predetermined condition of the rule may be only dairy products (e.g., cheese, yogurt, etc.) that appear on the webpage after the search query is submitted. If the results of the applied rule indicate that the type of products that appear on the webpage is different from the predetermined condition, then rule application system 324 may determine that the webpage is abnormal. If the results of the applied rule indicate that the type of products that appear on the webpage is the same as the predetermined condition, then rule application system 324 may determine that the webpage is normal.

In another example, a rule may test the type of products that appear on a webpage after a product category is selected. For example, a product category may be "shoes." The predetermined condition of the rule may be only shoe products (e.g., sneakers, slippers, etc.) that appear on the webpage after the product category is selected. If the results of the applied rule indicate that the type of products that appear on the webpage is different from the predetermined condition, then rule application system 324 may determine that the webpage is abnormal. If the results of the applied rule indicate that the type of products that appear on the webpage is the same as the predetermined condition, then rule application system 324 may determine that the webpage is normal.

In another example, a rule may test whether the correct images of products appear on a webpage after a search query is submitted or a product category is selected. For example, a search query or product category may be "shoes." The predetermined condition of the rule may be images associated with each shoe product that appears on the webpage after the search query is submitted or the product category is selected. If the results of the applied rule indicate that images are not loaded for products or an incorrect image is loaded with a product, then rule application system 324 may determine that the webpage is abnormal. If the results of the applied rule indicate that correct images, as defined by predetermined conditions, are loaded for each product, then rule application system 324 may determine that the webpage is normal.

Rule application system 324 may send the results of the applied rule to monitoring platform 310. Based on the characteristics of the webpage and the results of applied rule, monitoring platform 310 may, automatically or by user instruction, instruct rule application system 324 to send an alert (e.g., by an instant messaging platform) or analytics of the results (e.g., product or item identifications associated with the webpage, product or item categories associated with the webpage, queries associated with the webpage, description of any webpage abnormalities, run time of applied rule, etc.) of the applied rule to at least one user device (e.g., user devices 342A or 342B associated with internal users). If the results indicate that the webpage is abnormal, then monitoring platform 310 may not implement API 332 or webpage 334 to allow API 332 or webpage 334 to be further developed (e.g., modified by user devices or internal users). If the results indicate that the webpage is normal, then monitoring platform 310 may implement API 332 or webpage 334. Back-office software 318 may send a response to user device 342B where the response may include an indication of whether API 332 or webpage 334 has been implemented, analytical data associated with the applied rule, an indication of whether alerts or analytics were sent to user devices 342A or 342B, etc.

Figure 4:
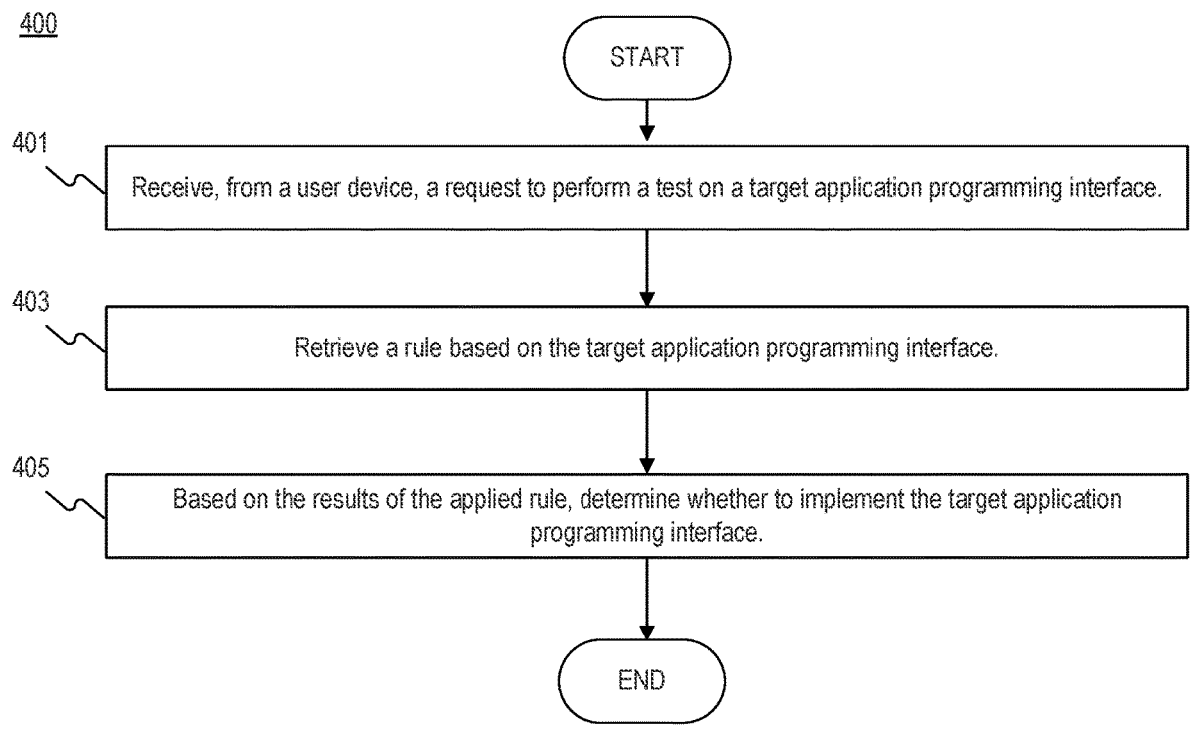
FIG. 4 depicts a process for managing and monitoring services and modules, consistent with disclosed embodiments.

Referring to FIG. 4, a process 400 for managing and monitoring services and modules, consistent with disclosed embodiments is shown.

At step 401, monitoring platform 310 may receive a request from a user (e.g., internal users) or user device to perform a test on a target service or module. Monitoring platform 310 may send the request to scheduler system 320. In some embodiments, scheduler system 320 may, based on a scheduled time or triggered by an event, automatically test services or modules. In some embodiments, scheduler system 320 may concurrently test a plurality of services or modules. Scheduler system 320 may log data associated with tests, including estimated run times of the tests, test results, or actual run times of the tests.

Based on the received request, page response system 322 may call a target API 332 or a target webpage URL. Based on the call by page response system 322, target API 332 may retrieve a webpage with an implemented module (e.g., webpage may be SRP of FIG. 1B) or target webpage 334 may retrieve a webpage (e.g., a webpage may be SRP of FIG. 1B without an implemented module). API 332 or webpage 334 may send the retrieved webpage to page response system 322.

Page response system 322 may parse the retrieved webpage by loading the URL (e.g., which references JSON or HTML code) for the retrieved webpage associated with API 332 or the retrieved webpage associated with webpage 334 and extracting data from the retrieved webpage. In some embodiments, user device 342A may specify the data to be extracted from the webpage. In some embodiments, page response system 322 may automatically determine the data to be extracted from the webpage based on characteristics of the webpage (e.g., the extracted data may include a type of search query on the webpage, product or item categories on the webpage, type of products or items on the webpage for a specific category, type of products or items on the webpage as a result of a search query, etc.).

At step 403, page response system 322 may send the retrieved webpage to rule application system 324 and rule application system 324 may retrieve at least one rule from database 316 based on the characteristics of the webpage. Page response system 322 may determine the data to be extracted from the webpage based on the retrieved rule. Page response system 322 may send the retrieved webpage or the extracted data from the webpage to rule application system 324. Rule application system 324 may apply the retrieved rule to the data extracted from the webpage. The retrieved rule may include a predetermined condition for determining whether the webpage is normal or abnormal. For example, a rule may test the number of products that appear on a webpage after a search query is submitted. The predetermined condition of the rule may be a number of products that appear on the webpage after the search query is submitted. If the results of the applied rule indicate that the number of products that appear on the webpage is different from the predetermined condition, then rule application system 324 may determine that the webpage is abnormal. If the results of the applied rule indicate that the number of products that appear on the webpage is the same as the predetermined condition, then rule application system 324 may determine that the webpage is normal.

Rule application system 324 may send the results of the applied rule to monitoring platform 310. Based on the characteristics of the webpage and the results of applied rule, monitoring platform 310 may, automatically or by user instruction, instruct rule application system 324 to send an alert (e.g., by an instant messaging platform) or analytics of the results (e.g., product or item identifications associated with the webpage, product or item categories associated with the webpage, queries associated with the webpage, description of any webpage abnormalities, run time of applied rule, etc.) of the applied rule to user devices 342A or 342B.

At step 405, if the results indicate that the webpage is abnormal, then monitoring platform 310 may not implement API 332 or webpage 334 to allow API 332 or webpage 334 to be further developed (e.g., modified by internal users). If the results indicate that the webpage is normal, then monitoring platform 310 may implement API 332 or webpage 334. Back-office software 318 may send a response to a device or a user where the response may include an indication of whether API 332 or webpage 334 has been implemented, analytical data associated with the applied rule, an indication of whether alerts or analytics were sent to user devices 342A or 342B, etc.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing and monitoring services and modules, comprising:
a memory storing instructions; and
at least one processor configured to execute the instructions to:
apply a rule to a search result page associated with an application programming interface, wherein the rule comprises at least one of:
determining whether a number of products on the search result page matches a predetermined condition;
determining whether types of products on the search result page matches a predetermined condition; or
determining whether images of products on the search result page matches a predetermined condition; and
based on results of the applied rule, determine whether to implement the application programming interface, wherein the results indicate whether the search result page is normal or abnormal; and
based on the results indicating that the search result page is abnormal, sending an alert to a user device comprising a description of the search result page abnormality and not implementing the application programming interface.

2. The system of claim 1, wherein the at least one processor is further configured to execute the instructions to retrieve the search result page by parsing the search result page.

3. The system of claim 2, wherein parsing the search result page comprises:
loading a uniform resource link associated with the application programming interface; and
extracting data from the search result page, wherein the rule is applied to the extracted data.

4. The system of claim 3, wherein the extracted data is specified based on the rule.

5. The system of claim 1, wherein the alert further comprises an item identification.

6. The system of claim 1, wherein if the results indicate that the search result page is normal, then the processor further executes the instructions to implement the application programming interface.

7. The system of claim 1, wherein
the predetermined condition further comprises:
a number of items on the search result page based on a search query;
a number of items on the search result page based on an item category;
types of items on the search result page based on a query; or
types of items on the search result page based on a category.

8. The system of claim 1, wherein implementing the application programming interface comprises inserting the application programming interface into the search result page.

9. A computer-implemented method for managing and monitoring services and modules, comprising:
applying a rule to a search result page associated with an application programming interface, wherein the rule comprises at least one of:
determining whether a number of products on the search result page matches a predetermined condition;
determining whether types of products on the search result page matches a predetermined condition; or
determining whether images of products on the search result page matches a predetermined condition; and
based on results of the applied rule, determining whether to implement the application programming interface, wherein the results indicate whether the search result page is normal or abnormal; and
based on the results indicating that the search result page is abnormal, sending an alert to a user device comprising a description of the search result page abnormality and not implementing the application programming interface.

10. The method of claim 9, further comprising retrieving the search result page by parsing the search result page.

11. The method of claim 10, wherein parsing the search result page comprises:
loading a uniform resource link associated with the application programming interface; and
extracting data from the search result page, wherein the rule is applied to the extracted data.

12. The method of claim 11, wherein the extracted data is specified based on the rule.

13. The method of claim 9, wherein the alert further comprises an item identification.

14. The method of claim 9, wherein based on the results indicating that the search result page is normal, then the method further comprises implementing the application programming interface.

15. The method of claim 9, wherein
the predetermined condition further comprises:
a number of items on the search result page based on a search query;
a number of items on the search result page based on an item category;
types of items on the search result page based on a query; or
types of items on the search result page based on a category.

16. The method of claim 9, wherein implementing the application programming interface comprises inserting the application programming interface into the search result page.

* * * * *